A. M. WISWELL.
SPREADING MACHINE.
APPLICATION FILED MAR. 19, 1915.

1,256,190.

Patented Feb. 12, 1918.
5 SHEETS—SHEET 1.

Witnesses
O. N. Woodward
Chr. Nielsen Jr.

Inventor
A. M. Wiswell.
H. L. Woodward
Attorney

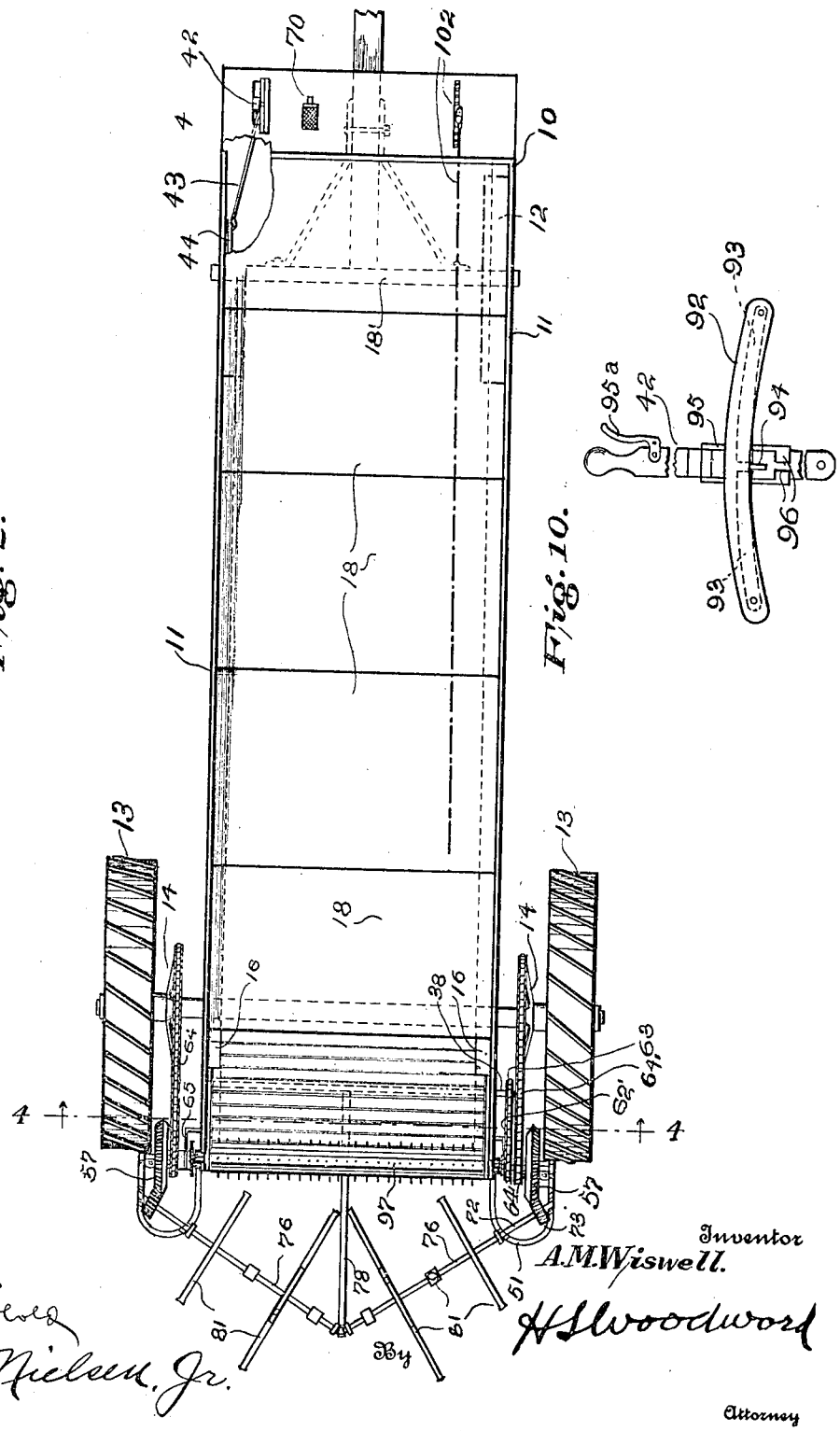

A. M. WISWELL.
SPREADING MACHINE.
APPLICATION FILED MAR. 19, 1915.

1,256,190.

Patented Feb. 12, 1918.
5 SHEETS—SHEET 3.

Witnesses
O. N. Woodward
Chs. Nickeny Jr.

Inventor:
A. M. Wiswell,
By H. L. Woodward,
Attorney.

A. M. WISWELL.
SPREADING MACHINE.
APPLICATION FILED MAR. 19, 1915.
1,256,190.
Patented Feb. 12, 1918.
5 SHEETS—SHEET 4.
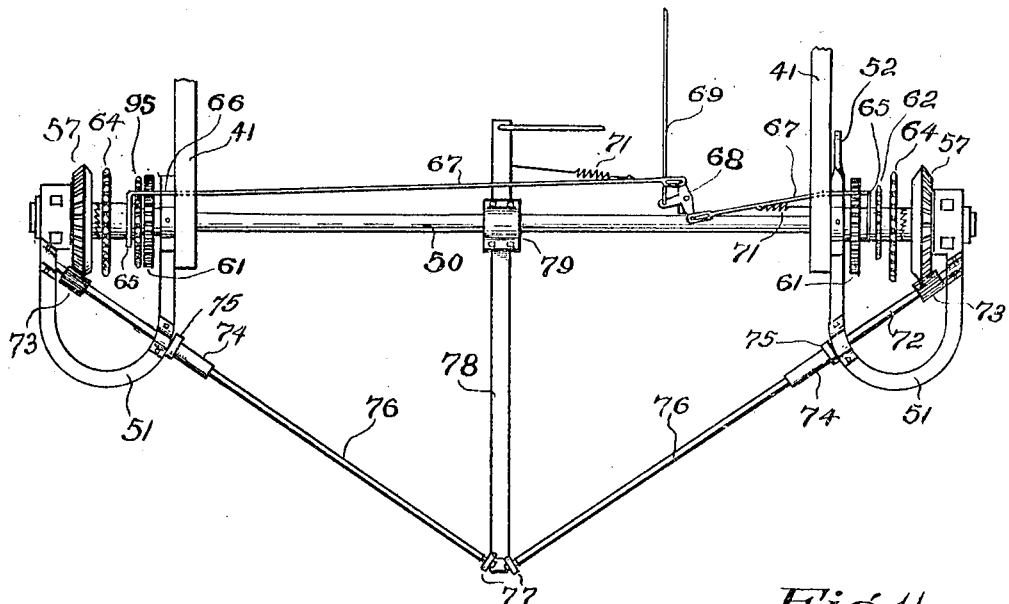
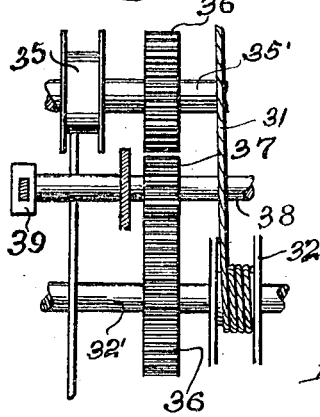
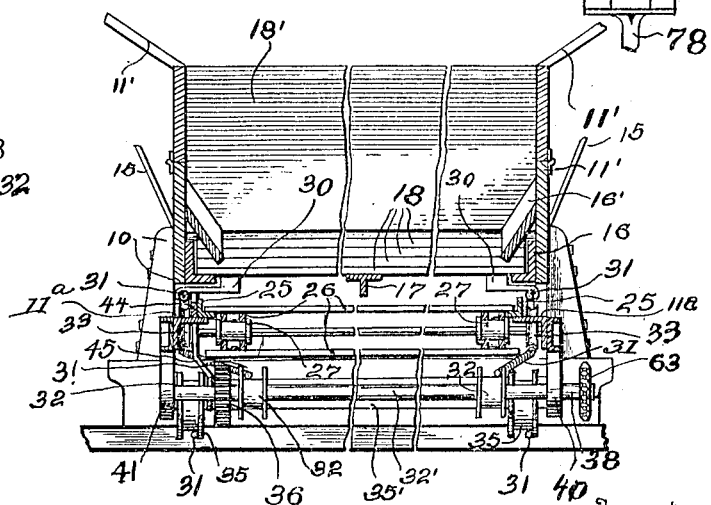
Witnesses
C. W. Phenold
Chr. Nielsen Jr.
Inventor
A. M. Wiswell.
By H. L. Woodward
Attorney

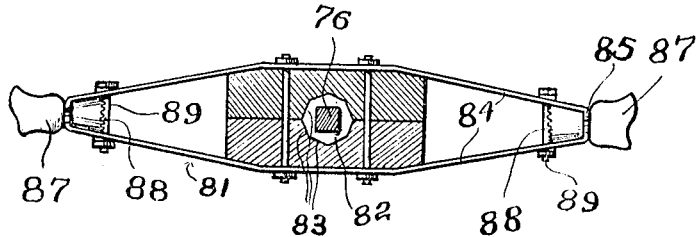
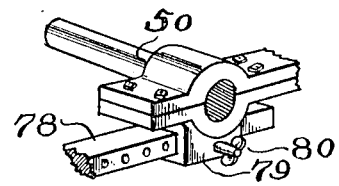
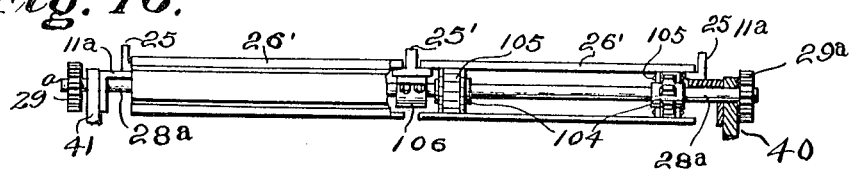
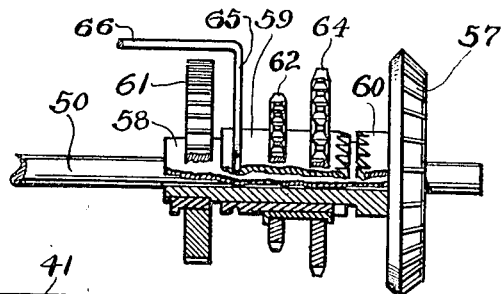
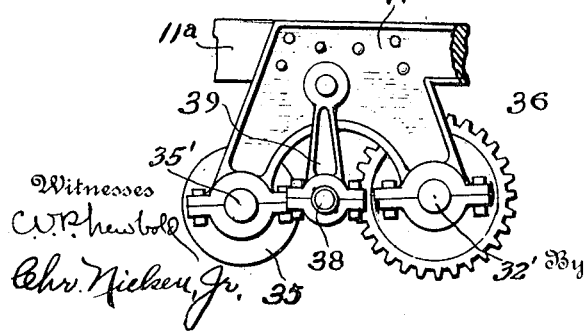

UNITED STATES PATENT OFFICE.

ARTHUR M. WISWELL, OF STAFFORD, KANSAS.

SPREADING-MACHINE.

1,256,190.  Specification of Letters Patent.  Patented Feb. 12, 1918.

Application filed March 19, 1915. Serial No. 15,451.

*To all whom it may concern:*

Be it known that I, ARTHUR M. WISWELL, a citizen of the United States, residing at Stafford, in the county of Stafford and State of Kansas, have invented certain new and useful Improvements in Spreading-Machines, of which the following is a specification.

The invention has for an object the provision of a spreader device adaptable without change to use with various materials, for distribution thereof in the desired quantity to a given distance traversed by the machine, whereby heavy and light, rich or poor materials may be given the individual handling suitable to their character. A further object of importance is to give a spreading mechanism effective over a path exceeding the width of the track of the apparatus in breadth, which will operate to distribute material evenly throughout the breadth of the path. In its present embodiment it is adapted to the spreading of straw and manure, although it may be readily adapted to other uses.

An important aim is to provide such a device which will be particularly effective when making a turn whereby the material discharged at each side will be properly proportioned to the area within the range of the machine. A further object is to give desirable new details of control for feeding mechanism whereby material is fed to a distributer, coöperative therewith. Additional objects and advantages, and features of invention will appear from the construction, arrangement, and combination of parts hereinafter set forth and shown in the drawings, in which, Figure 1 is a side elevation of my invention with one side of the body removed, Fig. 2 is a top view thereof.

Fig. 4 is a detail cross section on the line 4—4 of Fig. 2,

Fig. 5 is a detail of one of the distributer arms,

Fig. 6 is a detail of the bottom feed mechanism,

Fig. 8 is a detail of the power connections in plan,

Fig. 10 is a detail of the operating lever.

Fig. 11 is a detail of the bearings for the inner ends of the shafts 76,

Fig. 12 is a detail of the mounting of the arm 78,

Fig. 13 is an enlarged detail of the power connections at one side,

Fig. 14 is a detail of the mounting of the drum shafts and swinging drive shaft therefor.

Fig. 16 is a detail view of a double conveyer construction.

Figure 3:
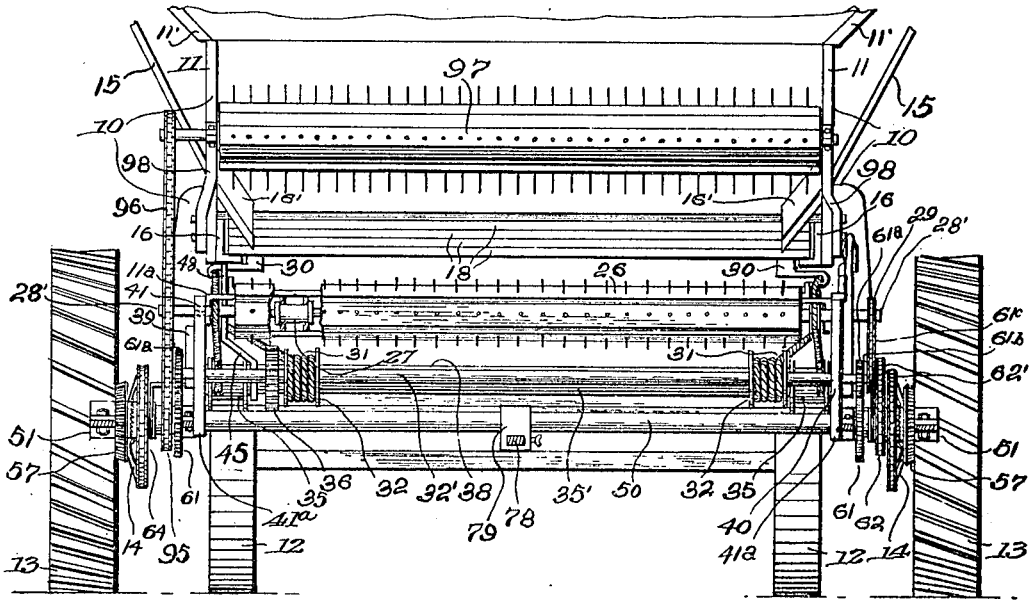
Fig. 3 is a rear view.
Figure 9:
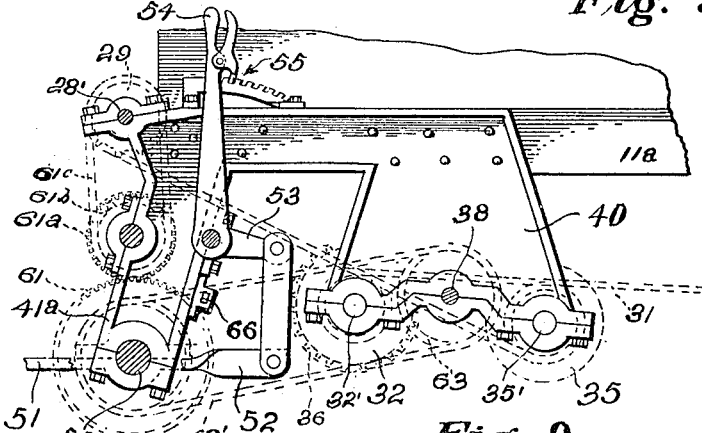
Fig. 9 is a detail of the adjusting device for the distributer and one of the brackets 41.

There is illustrated a combined straw and manure spreader suitable for use with various other materials also, comprising a frame work 10 including side pieces 11 and angle irons 11$^a$ at each side, supported in any customary way upon front and rear wheels 12 and 13, the latter having large driving sprockets 14 fixed thereto on their inner sides. The side pieces 11 carry also upper outwardly inclined parts 11' of a suitable height to permit carrying a very large load of material, suitably braced at 15. Fixed against the inner sides of the pieces 11 there are angle iron tracks 16, over which fending boards 16' are mounted on the sides 11, and if desired a central track rail 17 may be incorporated, in a plane with those 16 as shown in Fig. 3. Longitudinally slidable on these tracks there are transversely disposed sliding bottom panels 18, consisting of lengths of board or metal extending the full width of the machine between the tracks 16, and arranged to slide one over another to lie in superposed relation under an inclined stationary bottom piece 18' at the forward end of the machine, and suitably spaced above the tracks to permit ready passage of the panels thereunder. The first panel lies flat upon the track elements, and is provided at its forward edge with an upwardly projecting flange 19. Each succeeding panel is provided at its rear edge with a downwardly projecting flange 20 engaging slidably upon the upper surface of the next preceding lower panel, and at its forward edge is provided with a supporting flange 21 resting slidably upon the tracks to hold the panel parallel to the track, in addition to the forward flange 19 at the upper side. This last mentioned flange on the uppermost panel will engage the lower edge portion of the inclined bottom 18'.

Figure 7:
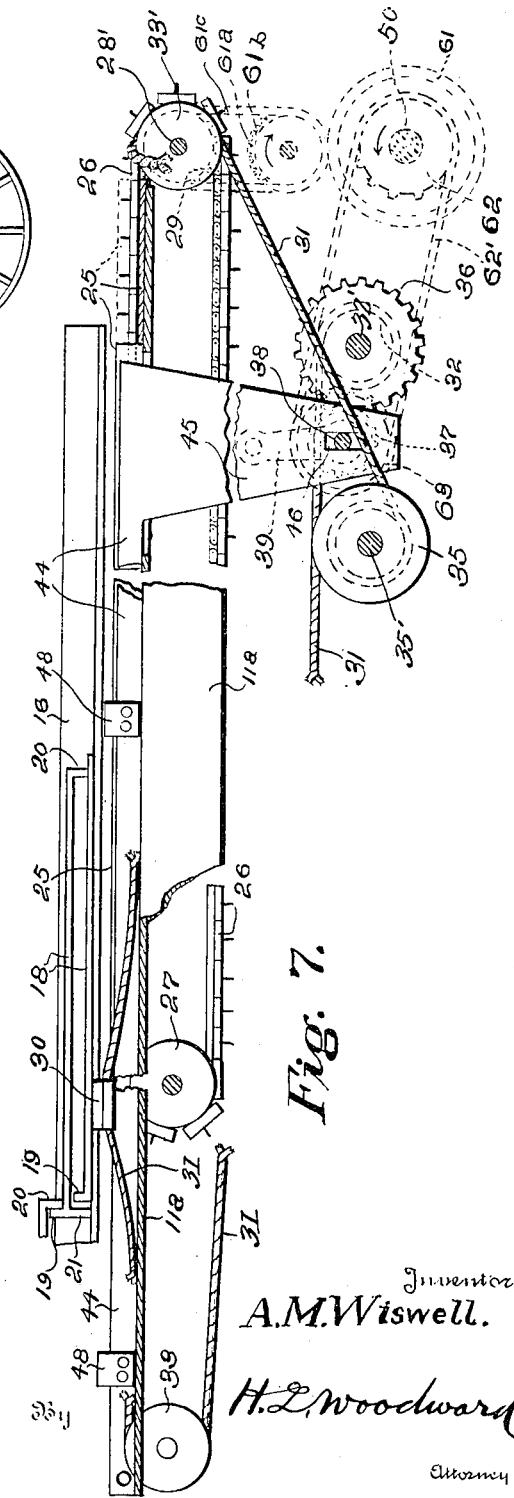
Fig. 7 is a further detail elevation of the bottom feeding mechanism.

Directly beneath the tracks 16 there are tracks 25 for an endless conveyer to be subsequently described. Carried by the first or lowermost panel 18 on its lower side there is a cable grip arm 30 extended outwardly under the tracks 16 and over the tracks 25 so as to clear the conveyer 26 freely and connected at their outer ends just outwardly of the tracks 25 to respective cables 31 by which the panels are moved. The cables extend forwardly and rearwardly from the arms 30, the forward portions being carried over pulleys 33 on the angle bars 11$^a$ at the forward part of the machine and thence rearwardly to drums 32 to be described, while the rear portions of the cables are carried over pulleys 33' at the rear of the bars 11$^a$ and thence forwardly to drums 35. The drums 32 are carried by a revoluble shaft 32' mounted in brackets 40 and 41 attached to the angle bars 11$^a$ at the respective sides of the machine. The drums 32 are located close to the sides of the machine, while the drums 35$^b$ are carried by a similar shaft 35' forwardly of the shaft 32' revoluble in the same brackets and are spaced considerably inward of the drums 32 so that the cable may pass directly from the drum to the respective pulleys at the ends of the machine without interference and without the necessity for intermediate guiding pulleys, as clearly shown in Figs. 6 and 7. The shafts 32' and 35' are provided with alined gears 36 driven alternately by a gear 37 carried by a shaft 38 mounted for lateral movement to shift the gear 37. The shaft is supported at one end by an arm 39 pendent on the bracket 41 at the left side, the bracket being open suitably for the purpose, as shown in Fig. 14. This shaft 38 is mounted so that the cables 31 may pass from the under sides of the drums 35 beneath the shaft 38 while the cables may pass from the upper sides of the drums 32 forwardly over the shaft 38. The shaft 38 is rotated in the same direction as the wheels 13 as will be explained. Opposite the arm 39 this shaft is suitably boxed in the bracket 40, through which it extends, being provided with the sprocket 63 outwardly of the bracket 40. The shaft 38 is controlled by means of a sliding bar 44 mounted on the angle bar 11$^a$ just outside the track 25 at one side of the machine. This bar is manually operated by means of a hand lever 42 at the front end of the machine, connected by a link 43 to the forward end of the bar 44. At the rear part of the bar a shift plate 45 is extended downwardly therefrom through a slot in the bar 11$^a$, the plate having a vertical slot 46, the sides of which closely engage the shaft 38 whereby it will be oscillated upon reciprocation of the bar 44. The shaft is also arranged to be automatically thrown out of gear when the sliding bottom has been fully extended or retracted, by the simple expedient of placing strikes 48 on the bar 44 adjacent each end, projected upwardly so as to engage the arm 30 on the lowermost panel 18 just before it reaches respective limits of its movement. Such engagement will cause movement of the bar 44 with the bottom panel in a direction to disengage the gear 37 from that gear 36 on the drum shafts by which the movement is communicated to the bottom through the cable 31.

Figure 1:
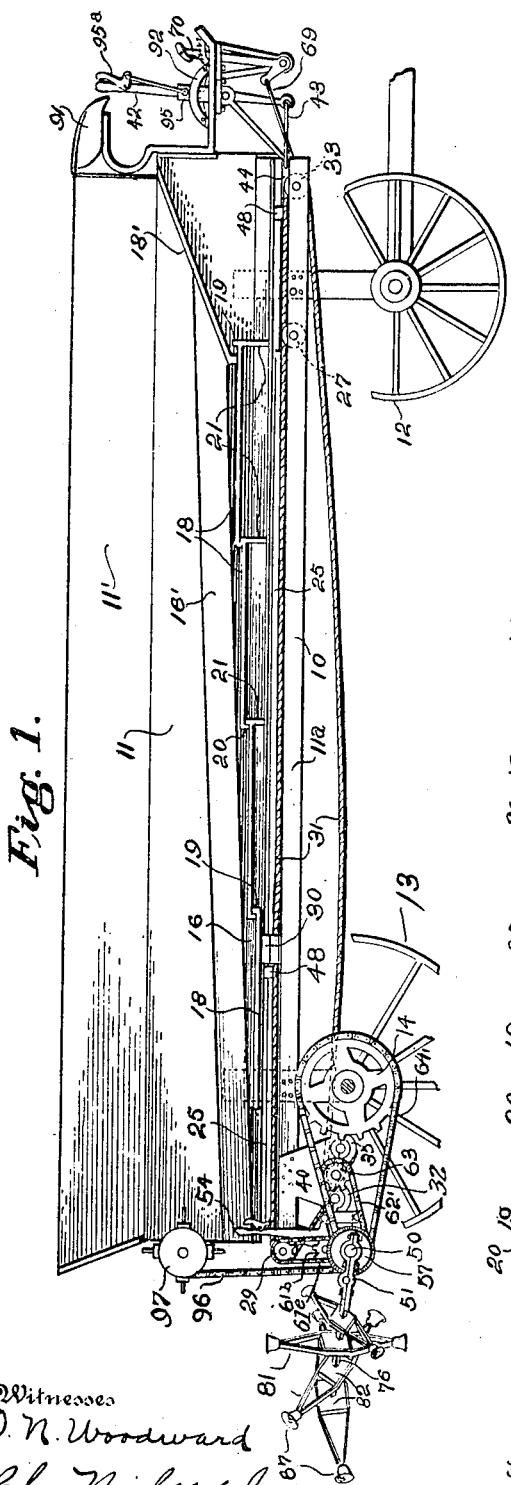

As shown in Figs. 1 and 10 the lever 42 has mounted therebeside a plain sector 92, upon opposite ends of which pawls 93 are mounted consisting of plain short bars pivoted at their outer ends adjacent the ends of the sector, and having their swinging ends disposed inwardly, stopping short of each other and normally held by gravity in position in the path of a lug 94 on the lever, by which it is held against movement in neutral position. A sliding yoke 95 is mounted on the lever having flanges 96 at each side arranged to engage beneath the respective pawls under upward movement, whereby they may be lifted out of the path of the lug to permit operation of the lever; the yoke being operated by the usual pivoted grip lever 95$^a$ properly connected to the yoke.

Figure 15:
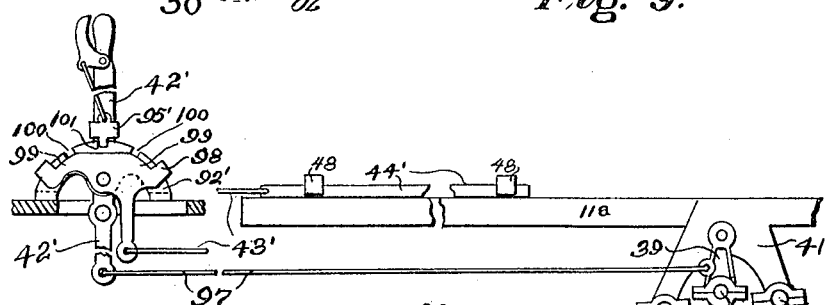
Fig. 15 is a detail of a modified control for the sliding bottom.

In Fig. 15 a different arrangement is shown, where the lever 42' is connected by a link 97 directly to the arm 39 supporting the swinging end of the shaft 38. The bar 44' corresponding to the bar 44 first described, is similarly mounted and arranged to be moved by the sliding bottom, but does not have connection with the shaft 38. The forward end of the bar 44' is connected by a link 43' to a lever thrower 98 comprising a rocking bar pivoted above the pivot of the lever 42' on the segment 92' and having intermediate end portions 99 movable vertically beside the segment to engage the sliding latch 95' on the lever 42' to lift it from engagement with respective forward and reverse notches 100 in the segment, under rocking of the bar in respective directions. The bar 98 is clear of the latch when in neutral notch 101 centrally of the segment 92'. The extremities of the bar 98 are extended upwardly and shaped so that continued movement of the bar 98 after disengagement of the latch serves to move the lever 42' for disengagement of the gear 37, as will be understood.

The endless conveyer 26 is carried by rollers 27 and 28 adjacent the front and at the rear end of the frame respectively, the former being mounted between the bars 11$^a$, and the shaft 28' of the last named roller being extended through these bars and suitably journaled in the brackets 40 and 41, from which it projects, and is provided with driving sprockets 29 at the ends, by which the conveyer is operated as will appear.

The brackets 40 and 41 have downward and rearward extensions 41ª revolubly mounted in which there is a horizontal shaft 50 projecting laterally outward of each bracket. To the projecting ends of the shaft 50 there are secured rocking frames 51, comprising simply U-shaped yokes secured in any suitable manner upon the shaft with their bights extending rearwardly, and each having one elongated forwardly extending arm 52 to which there is linked the forwardly extending arm 53 of a lever 54 pivoted intermediately of its length on the bracket 41, by which lever the frames 51 may be rocked, the lever being controlled by a segment and latch 55 of ordinary form. Mounted revolubly on each end of the shaft 50 within and close against the outer side of the frame 51 there is a beveled gear 57 having a hub 58 extending across the frame 51, upon which hub there is a revoluble and slidable sleeve 59 having a rosette face next to the gear arranged to mesh with a similar rosette 60 on the hub 58. The hub has a gear 61 secured thereon inwardly of the sleeve 59 and serving to limit the movement of the latter. The sleeve 59 has a sprocket 64 thereon receiving a chain 64' from the sprocket 14 on the adjacent wheel 13 of the machine. At one side of the machine the sleeve 59 has a sprocket 62 secured thereto from which an endless chain 62' is carried to a sprocket 63 on the outer end of the shaft 38. The gear 61 at each side is meshed with a small gear 61ª thereabove, which carries a small sprocket 61ᵇ connected by a chain 61ᶜ to the sprocket 29 at the adjacent end of the roller shaft 28, by which means the conveyer 26 is driven. Beside the gear 61 at the left side of the machine a sprocket 95 is secured on the hub 58 from which an endless chain 96 is extended to and operatively connected to a spiked feed roller 97 mounted on suitable brackets 98 at the rear end of the machine. This roller is found of great value in pulling down the body of the load in the machine as it is moved rearwardly. It prevents the material from falling onto the spreader arms in excessively large quantities at irregular intervals and assures an even feeding of the load to the distributing apparatus. The sleeves 59, Figs. 8 and 13, have peripheral grooves in which suitable shifting yokes 65 are engaged, movable by means of the rods 66 slidably mounted on the brackets 41 and connected by links 67 to respective oppositely extending arms of a triple crank lever 68, the third arm of which extends transversely of the machine and is connected by a rod 69 to a pedal 70 at the forward end of the frame 10. The links have lost-motion connections with the lever 68, the links being also engaged by springs 71 operative to hold the rosette yieldably in engaged position. Pressure on the pedal disengages the rosettes.

Carried by the frames 51 there are short shafts 72 revoluble thereon and extending diagonally thereacross at an angle to the shaft 50. The shafts 72 have respective gears 73 thereon meshed with the gears 57, and extend inwardly beyond the frames 51 having square sleeves 74 connected thereto by universal joints 75 of ordinary form. In the sleeves there are slidably engaged the outer squared ends of spreader shafts 76 extended inwardly and mounted in suitably pivoted bearings 77 closely adjacent each other on a bracket arm 78 engaged slidably in a yoke 79 fixed centrally on the shaft 50. This arm is axially coincident with the medial vertical longitudinal plane of the machine, and is so held by the yoke 79 that it will be rocked coincidently with the frames 51. It is longitudinally extensible to adjust the shafts 76 for a purpose which will appear hereinafter, and it is held in adjusted positions by means of a pin 80 engageable through suitable apertures formed in the yokes 79 and arm 78.

The shafts 76 are shown square in cross section, and the sleeves are of a length to allow sufficient longitudinal movement of the shafts under adjustment of the arm 78. The shafts 76 are provided with a plurality of longitudinally spaced arms 81 each comprising a hub element 82 fixed suitably on the respective shaft 76, and having two or more sets of parallel faces 83 upon which are clamped sheet metal arm sections 84 having their outer extremities on each side of the hub turned inwardly toward each other and cut away to form a circular opening 85 therebetween in which there is engaged the annular body portion of a head piece 87 which is enlarged on each side of the opposed end portions of the members 84, whereby the head member is held revoluble without longitudinal movement. The inner end of the head is formed with a plurality of diametrical grooves 88, and the members 84 are apertured to aline with one of these grooves when extending transversely therebetween, a bolt 89 being engaged through the apertures and alined groove, whereby the parts of the arm are held together and the head 87 secured against rotation. As many of these arms may be provided as found necessary or desirable, spaced longitudinally on the shaft 76. By arranging the shafts diagonally as shown in Fig. 2, the arms 81 will engage with a larger quantity of material moving rearwardly than if the shaft were simply at right angles to the major axis of the machine, also, the material engaged will be scattered with certainty on each side of the machine to a considerable distance if desired, the width of ground covered being regulated by extending or shortening the arm 78.

The head members 87 on the arms 81 are cup-like at their outer parts, and flared outwardly. They thus perform a hooking action upon material engaged and when worn away upon one side the bolts 89 may be removed and the heads rotated to present a more extended portion toward the work, and the bolts replaced again to hold them so adjusted.

A seat 91 is mounted at the front of the machine convenient to the lever 42 and pedal 70, and if a brake is required for the machine, any suitable form may be provided, controlled by a lever and connection 102, Fig. 2.

In use, the apparatus being connected and assembled, any suitable motive power being provided, the material to be distributed is loaded upon the machine between the sides 11, the panels 18 being all fully extended so that the conveyer 25 is nearly or quite covered thereby. The machine may then be moved to the point of distribution, the mechanism being out of gear, and liability of packing of manure or straw or other material into the conveyer obviated, whereby its operation will require a minimum of power. When spreading is to begin the foot pedal 70 is released to connect the mechanism with the driven sprockets 59, whereby spreading is immediately begun. After a time the lever 42 is operated to move the shaft 38 so that the first panel 18 will be moved forwardly sufficiently to allow the material over the panel to fall upon the conveyer.

The springs 71 and the slots in the links 67 where they are connected to the lever 68 will permit either of the sliding rosette members to ride on the rosette 60 when moved at a greater rate of speed by the drive connections on the opposite side of the machine, as will occur when turning.

By the use of the lever 42 the material may be fed to the conveyer at a rate corresponding to its character and the requirements, and the movement of the panels may be modulated to insure proper feeding of the material at all times.

When all material is discharged, the sliding panels may be returned to initial position through the operative connections by proper manipulation of the lever 42. It is to be observed that by the combination of the sliding panel bottom and endless conveyer a very heavy load may be discharged by the conveyer without creating excessive friction or requiring an excessive amount of power for its operation, which has been a serious difficulty in some prior devices.

The distance to which material is thrown may be largely governed by the rocking of the shaft 50 under adjustment of the lever 54, whereby the material engaged by the arms 81 will be given more or less elevated course when thrown outwardly. Extension and retraction of the arm 78 also will govern the scope of distribution laterally.

An important fact to be observed is that in conjunction with the sliding panels it is possible to operate the conveyer at a high rate of speed, so that it will perform a tearing action upon the material and project it outwardly with such force that it will be well broken up and properly engaged by the arms 81.

It is also to be observed that the device is applicable to use with materials which may be widely spread, or with such as require to be discharged so as to cover the ground thickly, which may be accomplished in several ways. Thus, the sliding bottom may be operated rapidly, so that a wide area is covered and the material quickly discharged, or the arm 78 may be used to adjust the shafts 76 forwardly at their inner ends so that the width of the area covered is decreased and the latter may be done at the same time that the paneled bottom is rapidly operated, if a very heavy deposit is desired. The adjustment of the shaft 50 also may be utilized to these ends.

Instead of the single conveyer 26 two conveyers 26' may be used, as shown in Fig. 16, side by side and having the same length as the single conveyer first described, as well as similar operative connections. That is to say, the shaft 28' is replaced by two shafts 28$^a$ in the same position and having on their outer ends the respective sprockets 29$^1$ or other operative connections. Each shaft carries two sprockets 104 meshed with respective chains 105 at the sides of each conveyer, and the inner ends of the shafts may be supported in a single boxing device 106. This boxing is shown on the under side of an inverted T-iron 25', the head flanges of which support the inner edges of respective conveyers on their upper reaches, while the stem flange of the iron serves to separate the conveyers.

It is to be observed that while the conveyers illustrated have closely spaced slats, so that no floor is required thereunder, wider spacing of the slats may be followed if desired, and any suitable form of floor provided under the upper reach of the conveyer. The conveyers are also shown provided with suitable spikes whereby efficient engagement with material is assured.

The double conveyer is of especial advantage in improving the function of the device when turning, and obviates the necessity for differential connections. One conveyer and the beater arms 81 there-adjacent will operate more slowly than the corresponding elements in the opposite side of the machine when a turn is made, the mechanism on the inner side operating more slowly, so as to distribute material in proper proportion to the ground traveled at that side. One set of distributing elements may even be stationary, if a very short turn is made.

The pedal 70 may be one of those familiar forms of brake pedals in which means is provided to hold the pedal forwardly at times after the foot of the operator is removed.

What is claimed is:

1. In a machine of the class described, a frame, a bottom comprising a multiplicity of sliding bottom panels movable thereon to lie at times in close superposed relation at the forward end of the frame, and movable to lie at other times in extended position with mutually adjacent edges overlapped means for so moving the panels, a high speed endless conveyer and shredder device movable under the bottom extending throughout the length of the bottom when in initial position, and arranged to receive material displaced from the panels to discharge the same, and operative connections for the conveyer.

2. In a machine of the class described, a wheeled frame, two parallel endless conveyer devices at respective sides of the frame for discharging material at the rear of the frame and separate operative connections between respective conveyers and the adjacent wheels.

3. In a machine of the class described, a wheeled frame, two sets of devices for discharging material rearwardly therefrom one at each side and separate operative connections between each set of devices and a respective laterally adjacent wheel.

In testimony whereof I affix my signature in presence of two witnesses.

ARTHUR M. WISWELL.

Witnesses:
F. B. HULL,
F. L. HAGENMASTER.

Copies of this patent may be obtained for five cents each, by addressing the "Commissioner of Patents, Washington, D. C."